H. R. KIDNEY.
TRACTOR.
APPLICATION FILED MAR. 11, 1919.
1,321,107.
Patented Nov. 11, 1919.
2 SHEETS—SHEET 1.
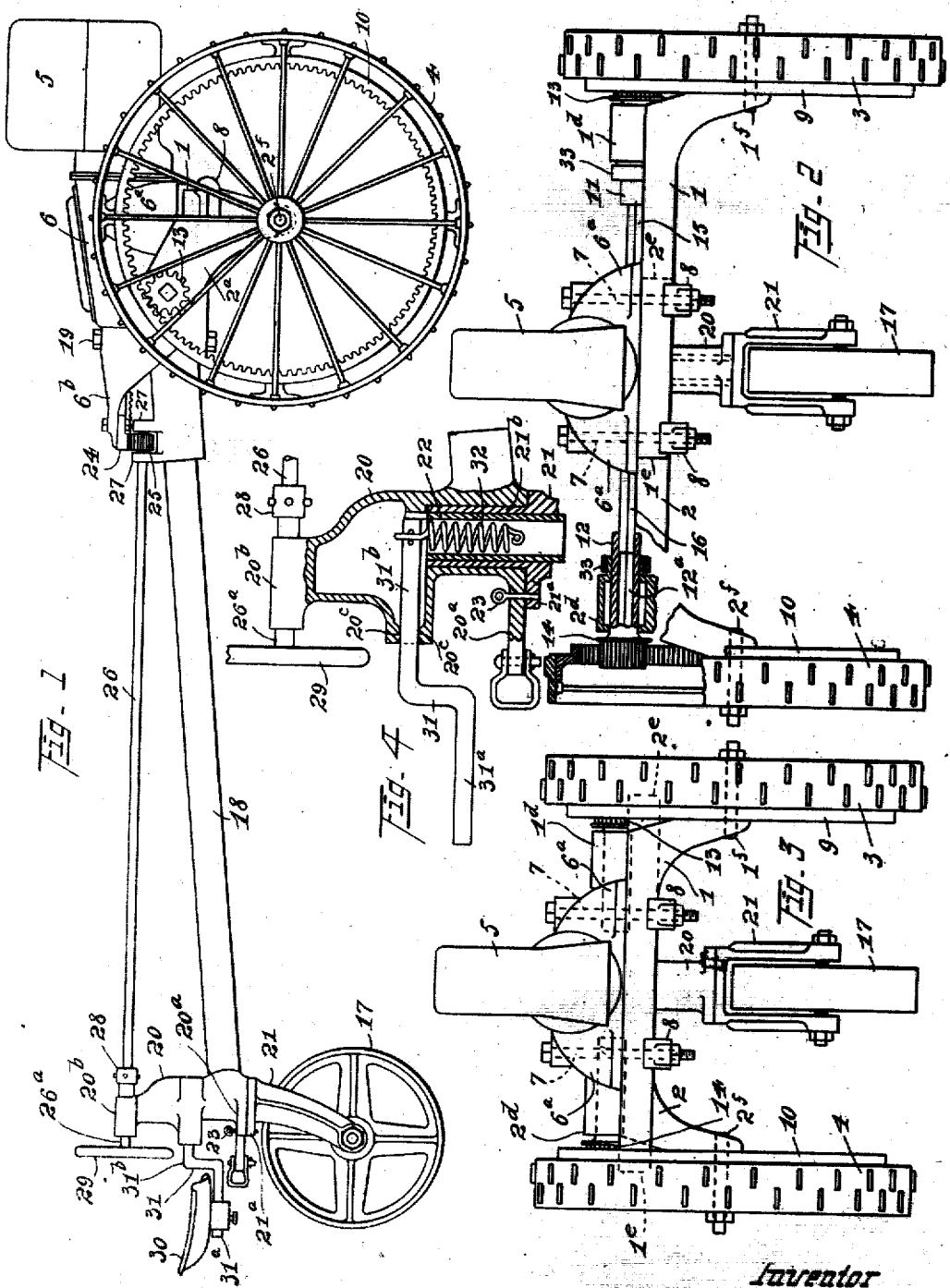
Inventor
Harvey R. Kidney
By [signature]
Atty.

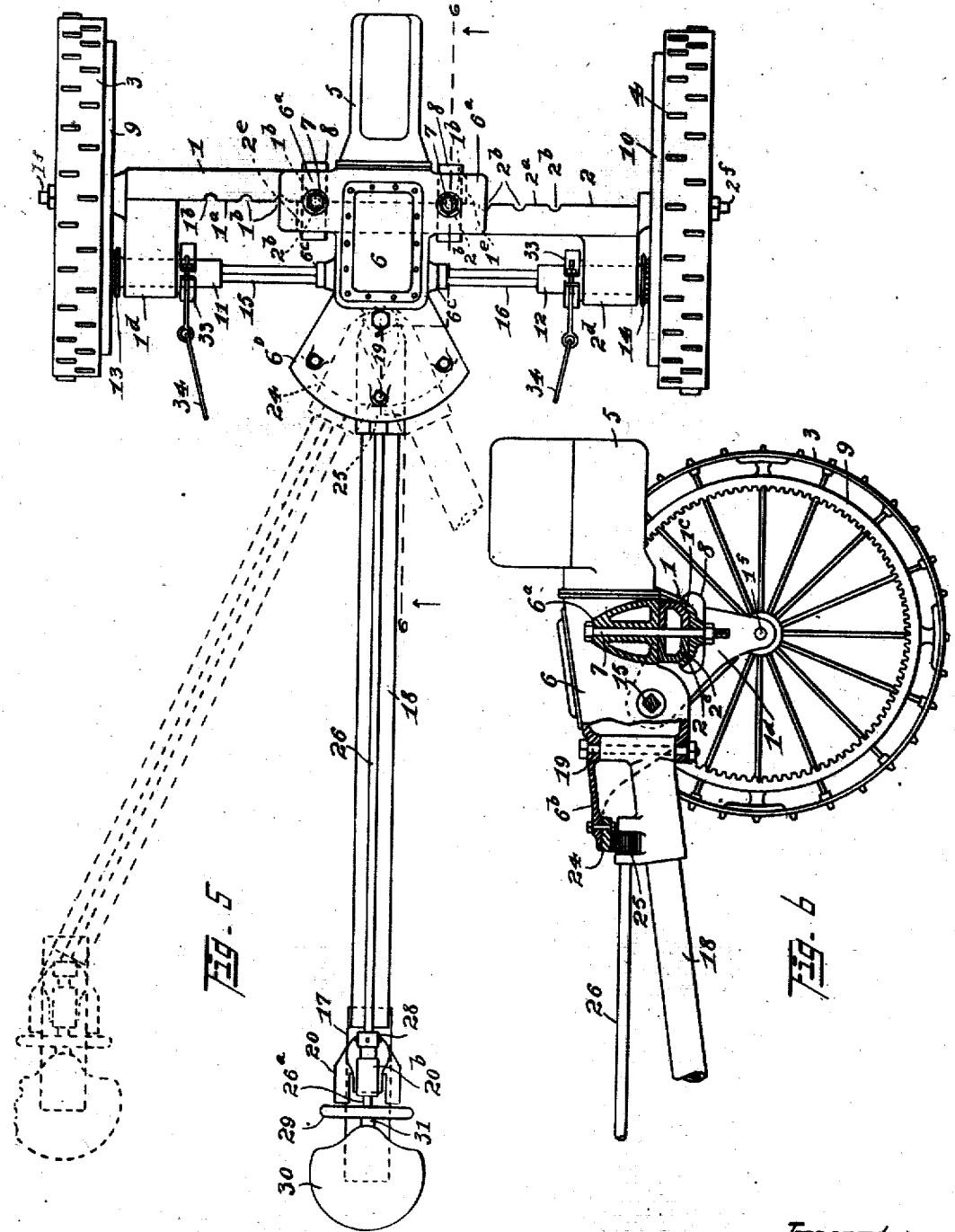

UNITED STATES PATENT OFFICE.

HARVEY R. KIDNEY, OF CLEVELAND, OHIO.

TRACTOR.

1,321,107.  Specification of Letters Patent.  Patented Nov. 11, 1919.

Application filed March 11, 1919. Serial No. 281,932.

*To all whom it may concern:*

Be it known that I, HARVEY R. KIDNEY, a citizen of the United States, residing at Cleveland, in the county of Cuyahoga and State of Ohio, have invented certain new and useful Improvements in Tractors, of which the following is a specification.

This invention relates to improvements in agricultural tractors, and it has for its primary object the provision of a machine suitable for general use on the farm, and one that is particularly adapted for cultivating when acting as a convoy to an implement employed for that purpose.

A further object of the present invention is to produce a machine of this class that is simple and durable in construction; that can be manufactured at comparatively low cost, maintained in operative condition at small expense and with economy of time. A salient feature of the invention consists in means that provide for a variable gage, the adjustment being simple and quickly manipulated.

The machine is self-propelled, has high clearance, is well adapted to varying conditions of soil, and is highly efficient in operation.

With the above mentioned, and other apparent objects in view, the invention consists in the construction, combination and arrangement of parts as hereinafter described and pointed out definitely in the appended claims, reference being had to the accompanying drawings which are made a part of the specification, similar reference characters being employed to designate corresponding parts.

In the said drawings Figure 1 is a side elevation of the improved tractor.

Fig. 2 is a front end view, partially in section, showing the machine at its maximum gage, and Fig. 3 is a similar view showing the tractor contracted laterally to the minimum gage as provided in the present embodiment.

Fig. 4 is a fragmentary view, on an enlarged scale, of the rear-wheel and seat support.

Fig. 5 is a plan view, and Fig. 6 is a fragmentary sectional side elevation taken on line 6—6 of Fig. 5.

The present embodiment of my invention, as illustrated in the drawings, provides two arched axle members 1 and 2, on which the ground traction wheels 3 and 4 are respectively revolubly mounted, trunnions $1^f$ and $2^f$ being provided therefor, said trunnions being in a plane parallel to and below the bodies of the axles, as shown. The engine casing 5 and transmission housing 6 are mounted on the axle members 1 and 2, as shown. A novel construction provides lateral adjustment of the members 1 and 2 relatively to each other, and maintains the combined members 5 and 6 in a medial position, or equidistant from the wheels 3 and 4 when said adjustments are brought about. By this construction, which will presently be described, a variety of gages can be obtained. This feature and the high clearance between the ground and the bodies of the axles, are appreciable advantages of a tractor when used in the operation of cultivating.

The members 1 and 2 overlap and are adapted to bear on each other, being slidable laterally when not locked as provided. The bearing faces $1^a$ and $2^a$ are provided respectively with vertical grooves $1^b$ and $2^b$. The said grooves are correspondingly spaced and adapted to registration for the accommodation of locking bolts 7. The housing member 6 is provided with laterally extending wings $6^a$ through which the bolts 7 pass and extend down through the registering grooves in the members 1 and 2. Clamping members 8 are provided, said members being adapted to be drawn by the bolts 7 against oppositely inclined surfaces $1^c$ and $2^c$ on the members 1 and 2, thereby forcing the faces $1^a$ and $2^a$ to a bearing, and thus locking the lateral adjustment of the members 1 and 2.

The ground traction wheels 3 and 4 are provided with gear members, in the present embodiment internal gear rings 9 and 10 are rigidly attached to said wheels, and brackets $1^d$ and $2^d$ on the members 1 and 2 provide bearings for spindles 11 and 12, said spindles carrying spur pinions 13 and 14 which are in mesh with the gears 9 and 10 respectively. The spindles 11 and 12 are provided with longitudinal bores, said bores being square in cross-section and extending entirely through the spindles, as best shown at $12^a$, Fig. 2.

Two driving shafts 15 and 16 are adapted to be driven by the engine through the transmission mechanism which is inclosed within the housing 6. The shafts 15 and 16 are squared from the bearings $6^e$ to their outer terminals and are adapted to a sliding fit in the squared bores of the spindles 11 and 12, thereby accommodating the driving and mechanism to the lateral expansion and contraction, or the varying gages of the ground wheels, without disarranging of the transmission mechanism or the employment of clutches.

When the machine is adjusted to the maximum gage, as shown in Figs. 2 and 5, the members 1 and 2 bear on each other between the terminals 1$^c$ and 2$^c$, the locking bolts 7 passing through corresponding grooves 1$^b$ and 2$^b$, the outer groove 1$^b$ registering with the inner groove 2$^b$ and the outer groove 2$^b$ registering with inner groove 1$^b$. The spindles 11 and 12 are carried outward by the bearing brackets 1$^d$ and 2$^d$, and slide on the squared shafts 15 and 16. The said shafts extend a sufficient distance into the bores of the spindles to drive said spindles. The pinions 13 and 14 are retained in their operative positions in mesh with the gears 10 and 11, the torque being taken by the spindles in the bearings 1$^a$ and 2$^d$, and not affecting the alinement of the driving shafts.

When the machine is adjusted to the minimum gage, as shown in Fig. 3, the members 1 and 2 overlapping each other terminate as shown by dotted lines 1$^e$ and 2$^e$, and the shafts 15 and 16 extend entirely through the bores of the spindles 11 and 12, the driving pinions and gears remaining in the same relative positions.

The rear of the machine is supported by a trailing ground wheel 17 mounted casterlike and attached to the forward structure by a connecting member 18, said member 18 being pivotally connected with the housing 6 by the bolt 19. This construction allows the trailing wheel 17 and the members connected therewith, to be shifted to the right or left as desired, so that the trailing wheel may travel in a medial path, or in line with either the right or left forward wheels.

The connecting member 18 is rigidly connected with a housing 20, and the fork 21 in which the wheel 17 is mounted, is journaled in said housing, the stem 21$^b$ being provided for this purpose and having a tubular member 22 in the bore thereof. The fork member 21 is provided with a flange 21$^a$, and the housing 20 has a bearing flange 20$^a$ thereon. Registering holes are provided in the flanges 20$^a$ and 21$^a$ to accommodate a removable pin 23. By this arrangement it will be seen that the wheel-fork may be allowed to oscillate freely in the housing 20, or it may be locked to said housing.

An overhanging portion 6$^b$ of the housing 6, carries a depending segmental gear 24, the segment being formed with the pivotal bolt 19 as a center. This segmental gear is one element of the steering mechanism, and is in mesh with a pinion 25 carried on the steering rod 26. The rod 26 is mounted in bearings 27. A universal joint of any suitable design, indicated by 28, provides a flexible operative connection between the rod 26 and rod 26$^a$, said rod 26$^a$ being mounted in the housing 20 at 20$^b$, and having a hand-wheel 29 connected therewith in convenient position for manipulation by the operator when seated on the seat 30.

The seat 30 is mounted on a seat post 31 that is inserted in the housing 20. The seat post 31 is formed so that the portion 31$^a$ to which the seat 30 is attached, is in a lower horizontal plane than the part 31$^b$ which is inserted in the housing. This peculiar construction renders the seat automatically adjustable relatively to uneven conditions of the ground operated on, as the weight of the operator retains him in a perpendicular posture when the machine is tipped to the right or left according to ground conditions. A yielding or resilient seat movement is provided by an annular line bearing of the member 31$^b$ in the housing 20, as shown at 20$^c$, Fig. 4, co-acting with a spring 32 connected with the element 31$^b$ and anchored in the tubular member 22.

Provision is made for abrupt turning of the tractor. With this in view, the driving spindles 11 and 12 are provided with suitable brakes 33 which may be operated by any well known means, as for example, connecting rods 34, shown broken away in Fig. 3. When brake pressure is applied to spindle 11 the wheel 3 becomes locked, and wheel 4 being driven, guides the machine to the left in a short turn. The opposite result will, as a matter of course, be obtained by the application of brake pressure to spindle 12, with spindle 11 released.

While I have described an operative embodiment of my invention, it will be understood that there may be various changes in the details of construction without departure from the nature of the invention, and that I am confined to this specific construction only so far as limited by the scope of the claims.

What I claim and desire to secure by Letters Patent is.

1. In a tractor, two axle members adapted to overlap each other, means for lateral adjustment of the overlap, ground traction wheels mounted on said axles, an engine and power transmission mechanism provided with suitable housing supported on said axles, laterally adjustable means connected with the transmission mechanism and the traction wheels for driving the tractor, a rear wheel mounted in a suitable housing, and means for connecting said housing with the forward structure of the machine.

2. In a tractor, two corresponding axle members adapted to overlap each other and provided with laterally extending trunnions, the overlapping parts of said axles being in a plane parallel to and above the horizontal line of the trunnions, means for lateral adjustment of the overlap, ground traction wheels mounted on the axle trunnions, an engine and power transmission mechanism mounted on the raised portions of the axles, laterally adjustable means connected with the transmission mechanism and the traction wheels for driving said wheels, a trailing wheel mounted in a suitable housing, and means for connecting said housing with the forward structure.

3. In a tractor, two corresponding axle members adapted to overlap and bear on each other for lateral adjustment, vertical grooves in the bearing faces of the axle members, said grooves being adapted to register, clamping means coacting with said grooves for maintaining the gage adjustment of the tractor, ground traction wheels mounted on the axles, an engine and power transmission mechanism provided with suitable housing supported on the axles, laterally adjustable means connected with the transmission mechanism and the traction wheels for driving said wheels, a trailing wheel mounted in suitable housing, and means for connecting said housing with the forward structure.

4. In a tractor, two corresponding axle members adapted to overlap each other and provided with laterally extending trunnions, the overlapping parts of said axles being in a plane parallel to and above the horizontal line of the trunnions, means for lateral adjustment of the overlap, said means consisting of clamping devices which coact with registering grooves provided in the overlapping parts of the axle members, ground traction wheels mounted on the axle trunnions, an engine and power transmission mechanism provided with suitable housing supported on the elevated portions of the axles, laterally adjustable means connected with the transmission mechanism and the traction wheels for driving said wheels, a trailing wheel mounted in suitable housing, and means for pivotally connecting said housing with the forward structure.

5. In a tractor, two corresponding axle members adapted to overlap and bear on each other and provided with laterally extending trunnions, the overlapping parts of said axles being in a plane parallel to and above the horizontal line of the trunnions, means for lateral adjustment of the overlap, ground traction wheels mounted on the axle trunnions, an engine and power transmission mechanism provided with suitable housing supported on the elevated portions of the axles, gear members connected with the traction wheels, brackets on the axle members in juxtaposition to the traction wheels, spindles mounted in said brackets, said spindles carrying pinions in mesh with the gears on the traction wheels, drive shafts connected with the transmission mechanism and slidable longitudinally in the spindles, means for preventing the rotation of said shafts in the spindles, a trailing wheel mounted in a suitable housing, and means for connecting said housing with the forward structure.

6. In a tractor, two corresponding axle members adapted to overlap each other and provided with laterally extending trunnions, the overlapping parts of said axles being in a plane parallel to and above the horizontal line of the trunnions, means for lateral adjustment of the overlap, said means consisting of clamping devices which coact with registering grooves provided in the overlapping parts of the axle members, ground traction wheels mounted on the axle trunnions, an engine and power transmission mechanism provided with suitable housing supported on the elevated portions of the axles, laterally adjustable means connected with the transmission mechanism and the traction wheels for driving said wheels, said means comprising shafts connected with the transmission mechanism and slidable longitudinally in spindles mounted in bearings provided on the axle members, means being provided for preventing rotation of said shafts in the spindles, gears connected with the traction wheels, and pinions on the spindles, in mesh with said gears, a trailing wheel mounted in suitable housing, means for pivotally connecting said housing with the forward structure, gear mechanism connected with the forward structure for steering the machine, and means for manually actuating said gear mechanism by the operator located on the rear housing.

7. In a tractor, the combination of two corresponding forward axle members adapted to overlap and bear on each other for lateral gage adjustment, the outer ends of said axle members depending and provided with trunnions which extend laterally in a plane lower than the horizontal plane of the overlapping parts; ground traction wheels mounted on said trunnions; clamps for controlling the lateral adjustment of the axle members; an engine and power transmission mechanism supported on the axle members; gears connected with the traction wheels; spindles mounted on the axle members in juxtaposition to the traction wheels; pinions carried by said spindles, in mesh with the traction wheel gears; drive shafts connected with the transmission mechanism and slidable longitudinally in the spindles; means for preventing rotation of said shafts in the spindles; a rearwardly extending frame member pivotally connected with the forward structure; a trailing ground wheel having a caster mounting in said frame, thereby adapting it to horizontal oscillation;

means for checking the oscillation; and steering mechanism on the forward structure, said mechanism being operated from the rear frame.

8. In a tractor, two corresponding axle members adapted to overlap each other and provided with laterally extending trunnions, the overlapping parts of said axles being in a plane parallel to and above the horizontal line of the trunnions, vertical registering grooves in the bearing faces of the axle members, an engine and transmission mechanism provided with suitable housing supported on said axles, bolts extending through said housing and the registering grooves and through clamp members adapted to bear on the under side and the opposite transverse sides of the axle members, whereby said axle members are clamped together, traction wheels mounted on the axle trunnions, laterally adjustable means connected with the transmission mechanism and the traction wheels for driving the tractor, a trailing wheel mounted in a suitable housing, and means for connecting said housing with the forward structure of the machine.

In testimony whereof I affix my signature.

HARVEY R. KIDNEY.